US007818840B2

(12) United States Patent
Barnett et al.

(10) Patent No.: US 7,818,840 B2
(45) Date of Patent: *Oct. 26, 2010

(54) FOLDABLE, PORTABLE TRAUMA TREATMENT AND MONITORING PATIENT PLATFORM

(75) Inventors: Peter Andrew Barnett, Costa Mesa, CA (US); Todd Douglas Kneale, Brea, CA (US); Steven Bruce Alexander, Rolling Hills Estates, CA (US); Terrance Paul Domae, Cerritos, CA (US)

(73) Assignee: Integrated Medical Systems, Inc., Signal Hill, CA (US)

( * ) Notice: Subject to any disclaimer, the term of this patent is extended or adjusted under 35 U.S.C. 154(b) by 332 days.

This patent is subject to a terminal disclaimer.

(21) Appl. No.: 11/983,566

(22) Filed: Nov. 9, 2007

(65) Prior Publication Data

US 2009/0119844 A1 May 14, 2009

(51) Int. Cl.

| | |
|---|---|
| *A47B 1/00* | (2006.01) |
| *A45F 4/06* | (2006.01) |
| *A45F 4/08* | (2006.01) |
| *B62B 1/00* | (2006.01) |
| *B62B 3/00* | (2006.01) |
| *B62B 5/00* | (2006.01) |
| *B62B 7/00* | (2006.01) |
| *B62B 9/00* | (2006.01) |

(52) U.S. Cl. .................. 5/627; 5/626; 5/625; 224/156; 280/647; 280/648

(58) Field of Classification Search .................... 5/625, 5/626, 627, 658, 86.1, 610; 224/156, 155; 280/645, 648, 650, 652, 47.24, 47.26
See application file for complete search history.

(56) References Cited

U.S. PATENT DOCUMENTS 1,072,052 A * 9/1913 Stoehr .......................... 5/626

(Continued)

FOREIGN PATENT DOCUMENTS

EP 0002274 6/1979

(Continued)

OTHER PUBLICATIONS

Aeromed Systems, Inc., Specification / AMT 300, undated, 1 page, Fargo, North Dakota.

(Continued)

*Primary Examiner*—Michael Trettel
*Assistant Examiner*—Jonathan J Liu
(74) *Attorney, Agent, or Firm*—Stetina Brunda Garred & Brucker

(57) ABSTRACT

There is provided a foldable, portable, trauma treatment and monitoring patient platform. The patient platform includes an upper housing body including a top surface and an upper patient support surface. The patient platform also includes a lower housing body including a rear surface and a lower patient support surface. The upper and lower patient support surfaces are cooperative to collectively support a patient. The lower housing and upper housing are in pivotal communication to enable selective articulation about a pivoting axis between a closed orientation and an open orientation. In the closed orientation, the upper patient support surface is substantially flush with the lower patient support surface. In the open orientation, the upper patient support surface and lower patient support surface are substantially co-planar. A bay capable of receiving at least one medical monitoring/treatment unit is located within at least one of the upper and lower housing bodies.

32 Claims, 5 Drawing Sheets

U.S. PATENT DOCUMENTS

| | | | |
|---|---|---|---|
| 1,200,852 A | | 10/1916 | Kern |
| 1,256,219 A | | 2/1918 | Freedman et al. |
| 1,258,694 A | | 3/1918 | Miller |
| 1,287,855 A | | 12/1918 | Brand |
| 2,401,230 A | | 5/1946 | Colley |
| 2,704,989 A | | 3/1955 | Konecny |
| 2,837,778 A | | 6/1958 | Kern |
| 3,050,331 A | | 8/1962 | Mansen |
| 3,148,911 A | | 9/1964 | Boyer et al. |
| 3,348,245 A | | 10/1967 | Shindler |
| 3,376,059 A | | 4/1968 | Corl |
| 3,492,042 A | | 1/1970 | Nachtigall, Jr. |
| 3,531,151 A | | 9/1970 | Branfield |
| 3,678,921 A | | 7/1972 | Brendgord et al. |
| 3,761,968 A | | 10/1973 | Besler |
| 3,775,782 A | | 12/1973 | Rice et al. |
| 3,840,265 A | | 10/1974 | Stirling et al. |
| 3,877,427 A | | 4/1975 | Alexeev et al. |
| 4,003,378 A | | 1/1977 | Pickering |
| 4,034,740 A | | 7/1977 | Atherton et al. |
| 4,060,079 A | | 11/1977 | Reinhold, Jr. |
| 4,079,728 A | | 3/1978 | Gatts |
| 4,161,172 A | | 7/1979 | Pickering |
| 4,224,936 A | | 9/1980 | Cox |
| 4,347,635 A | | 9/1982 | Eisenhauer |
| 4,352,991 A | | 10/1982 | Kaufman |
| 4,425,978 A | | 1/1984 | Star |
| 4,485,806 A | | 12/1984 | Akers |
| 4,584,989 A | | 4/1986 | Stith |
| 4,680,790 A | | 7/1987 | Packard et al. |
| 4,715,385 A | | 12/1987 | Cudahy et al. |
| 4,724,844 A | | 2/1988 | Rafelson |
| 4,747,172 A | | 5/1988 | Hohol et al. |
| 4,757,811 A | | 7/1988 | Clark |
| 4,768,241 A | | 9/1988 | Beney |
| 4,780,919 A | | 11/1988 | Harrison |
| 4,783,109 A | | 11/1988 | Bucalo |
| 4,957,121 A | | 9/1990 | Icenogle et al. |
| 4,981,139 A | | 1/1991 | Pfohl |
| 5,005,230 A | | 4/1991 | Congdon |
| 5,016,307 A | | 5/1991 | Rebar |
| 5,020,546 A | | 6/1991 | Russo |
| 5,034,181 A | | 7/1991 | Billiu |
| 5,050,254 A | | 9/1991 | Murphy |
| 5,063,924 A | | 11/1991 | Galvan et al. |
| 5,077,843 A | | 1/1992 | Dale et al. |
| 5,084,922 A | | 2/1992 | Louit |
| 5,092,722 A | | 3/1992 | Raezer, III et al. |
| 5,111,818 A | | 5/1992 | Suzuki et al. |
| 5,117,521 A | | 6/1992 | Foster et al. |
| 5,121,514 A | | 6/1992 | Rosane |
| 5,149,030 A | | 9/1992 | Cockrill |
| 5,173,142 A | | 12/1992 | Billiu |
| 5,229,052 A | | 7/1993 | Billiu |
| 5,236,390 A | | 8/1993 | Young |
| 5,306,026 A | | 4/1994 | Jesse |
| 5,307,818 A | | 5/1994 | Segalowitz |
| 5,316,542 A | | 5/1994 | Koch et al. |
| 5,331,549 A | | 7/1994 | Crawford, Jr. |
| 5,331,991 A | | 7/1994 | Nilsson |
| 5,335,651 A | | 8/1994 | Foster et al. |
| 5,338,588 A | | 8/1994 | Billiu |
| 5,342,121 A | | 8/1994 | Koria |
| 5,375,277 A | * | 12/1994 | Carr et al. ...................... 5/625 |
| 5,404,877 A | | 4/1995 | Nolan et al. |
| 5,421,340 A | | 6/1995 | Stanga et al. |
| 5,441,047 A | | 8/1995 | David et al. |
| 5,474,574 A | | 12/1995 | Payne et al. |
| 5,494,051 A | | 2/1996 | Schneider, Sr. |
| 5,497,766 A | | 3/1996 | Foster et al. |
| 5,511,553 A | | 4/1996 | Segalowitz |
| 5,570,483 A | | 11/1996 | Williamson |
| 5,579,001 A | | 11/1996 | Dempsey et al. |
| 5,590,648 A | | 1/1997 | Mitchell et al. |
| 5,615,430 A | | 4/1997 | Nambu et al. |
| 5,626,151 A | | 5/1997 | Linden |
| 5,630,238 A | | 5/1997 | Weismiller et al. |
| 5,646,462 A | | 7/1997 | Cortes et al. |
| 5,664,270 A | | 9/1997 | Bell et al. |
| 5,680,661 A | | 10/1997 | Foster et al. |
| 5,687,717 A | | 11/1997 | Halpern et al. |
| 5,749,374 A | | 5/1998 | Schneider, Sr. |
| 5,781,422 A | | 7/1998 | Lavin et al. |
| 5,783,964 A | | 7/1998 | Eitan |
| 5,801,931 A | | 9/1998 | Kino et al. |
| 5,853,361 A | | 12/1998 | Kobayashi et al. |
| 5,975,081 A | | 11/1999 | Hood et al. |
| 6,001,057 A | | 12/1999 | Bongiovanni et al. |
| 6,182,667 B1 | | 2/2001 | Hanks et al. |
| 6,230,710 B1 | | 5/2001 | Sobko et al. |
| 6,282,094 B1 | | 8/2001 | Lo et al. |
| 6,525,942 B2 | | 2/2003 | Huang et al. |
| 7,093,321 B2 | * | 8/2006 | Burbrink et al. .............. 16/324 |
| 7,253,503 B1 | | 8/2007 | Fusaro et al. |
| 2007/0216118 A1 | | 9/2007 | Jackson et al. |

FOREIGN PATENT DOCUMENTS

| | | |
|---|---|---|
| EP | 0707867 | 4/1996 |
| FR | 1373384 | 11/1962 |
| GB | 0000117 | 0/1915 |
| GB | 1416697 | 12/1975 |
| GB | 1473862 | 5/1977 |
| JP | 62122664 | 6/1987 |
| JP | 6323665 | 11/1994 |
| WO | WO9401023 | 1/1994 |
| WO | PCT AU9500477 | 8/1995 |

OTHER PUBLICATIONS

Mobile Intensive Care Rescue Facility (MIRF), undated, 16 pages.
MOBI: Mobile Intensive Care Unit, Innovation in Critical Care Patient Transport, undated, 2 pages.
Buchanan Aircraft Corporation, (M.I.R.F.) Mobile Intensive Care Rescue Facility, undated, 17 pages, Queensland, Australia.
Spectrum Aeromed, Above and Beyond, undated, 14 pages, Wheaton, MN, USA.
LifePort, Inc., The Results of Innovation, undated, 30 pages, Vancouver, WA, USA.

* cited by examiner

FOLDABLE, PORTABLE TRAUMA TREATMENT AND MONITORING PATIENT PLATFORM

CROSS-REFERENCE TO RELATED APPLICATIONS

Not Applicable.

STATEMENT RE: FEDERALLY SPONSORED RESEARCH/DEVELOPMENT

Not Applicable

BACKGROUND

The present invention relates in general to portable emergency care devices. More particularly, the invention relates to a foldable, man-portable, trauma treatment and patient monitoring patient platform for use by an initial response medical care provider.

Sudden injury or disease may happen at a moment's notice. At the onset of such injury or disease, a patient often calls for the aid of an emergency response team. Upon arrival, members of the emergency response team assess the situation and diagnose the patient's condition. Oftentimes, patients cannot be sufficiently treated in the field, and require transport to a hospital or similar patient care center where more sophisticated equipment is readily available. It is during this transportation period where a patient's condition may worsen because of the lack of medical equipment available to the emergency response team. In the case of serious injury or disease, it is common that the patient must be treated within an hour of the initial onset of the disease or injury. Treatment within the first hour, the so-called golden hour, increases the likelihood of survival and successful recovery. Many times, this time constraint cannot be met due to various reasons. For example, the patient may be in a remote location, more than an hour away from the closest patient care facility.

Although this problem occurs frequently in civilian situations, it may be magnified in battlefield conditions, where significant injuries and disease commonly occur. The degree of injury and disease encountered on the battlefield shortens the treatment window. In addition, soldiers are often in remote, war-torn areas, or areas which are not easily accessible by vehicle, making it very difficult to respond to those requiring medical attention.

Although many patients require resources located at medical care centers, it is well-known for initial responders to bring emergency medical devices to the patient's location. Instruments such as stretchers and defibrillators are commonly brought into the field by medical response teams. Although these instruments are helpful in treating and transporting the patient, carrying such instrumentation to the patient's location may be difficult. Multiple members of the emergency response team may be required to carry each instrument. In addition, multiple members may be required to operate or carry the instrumentation during transport. For instance, the defibrillator may require additional personnel to hand-carry the device during transport because there may be no space to stow it.

Advances in technology have provided devices which enable medical instrumentality to be carried along with the stretcher. Consequently, a patient may be placed on a stretcher and medical care and monitoring instrumentation may be connected to the patient and placed within or on the stretcher, thereby eliminating the need to disconnect the equipment, or require additional personnel for hand-carrying during transport.

Although recent advances in technology have greatly enhanced emergency care and response, current systems are typically large and may require at least two medical care providers to transport the device to the patient's location. This requirement may severely limit the range of medical care that may be provided to a patient. This is especially true in the case of natural disasters and battlefield environments where vehicle transport may not be possible. Although individual medical devices, such as a defibrillator may be carried to the patient, current systems which integrate numerous medical devices are too large to be carried by one individual.

In addition, certain medical providers may have stretchers, but may not have medical monitoring/treatment equipment. Conversely, other medical providers may have medical monitoring/treatment equipment, but may not have stretchers. Furthermore, stretchers and equipment may be stored separately in different locations, making it difficult to quickly and adequately respond in emergency situations.

As such, there is a need in the art for a foldable, man-portable trauma treatment and monitoring patient platform.

BRIEF SUMMARY

According to an aspect of the present invention, there is provided a foldable, portable, trauma treatment and monitoring, patient platform. The patient platform includes an upper housing body including a top surface and an upper patient support surface. The patient platform also includes a lower housing body including a rear surface and a lower patient support surface. The upper and lower patient support surfaces are cooperative to collectively support a patient. The lower housing and upper housing are in pivotal communication to enable selective articulation about a pivoting axis between a closed orientation and an open orientation. In the closed orientation, the upper patient support surface is substantially flush with the lower patient support surface. In the open orientation, the upper patient support surface and lower patient support surface are substantially co-planar. A bay is located within at least one of the upper and lower housing bodies. The bay is capable of receiving at least one medical monitoring/treatment unit.

The present invention provides a highly portable trauma treatment and monitoring patient platform. The patient platform may be carried to the site of the injury and operated by one person. The present invention will greatly enhance emergency medical care, particularly in remote locations. The present invention may be of particular value when pre-deployed to areas of expectant traumatic injury such as combat forward aid stations, medivac units, civil disaster relief caches, or austere environments without extensive rapid response capability such as rural or maritime search and rescue. The present invention may also be particularly useful as a simplified emergency room back-up. In particular, the device may be stored in a closet and used when needed.

The patient platform may further comprise a triple-stop hinge coupled to the upper and lower housing bodies. The triple-stop hinge is capable of disposing the patient platform in the closed orientation, the open orientation, and a partially open orientation. In the partially open orientation, the upper and lower patient support surfaces are disposed between the closed and open orientations.

The patient platform may include additional accessories to further enhance its portability. For instance, the patient platform may include at least one strap coupled to the upper housing body to enable a medical provider to carry the patient platform when in the closed orientation. In addition, the patient platform may include a wheel to facilitate movement of the platform. A wheel may be disposed substantially adjacent to the pivoting axis. The wheel may be coupled to the upper or lower housing body. Such a wheel may facilitate platform movement when the platform is in the closed orientation and the partially open orientation.

The patient platform may further include an attachment member to enable integration with a standard NATO (North Atlantic Treaty Organization) litter. The patient platform may further include a mounting member to enable integration with an air casualty transport vehicle.

As was stated above, the patient platform includes at least one bay. The bay may be located in the upper housing body and/or the lower housing body. Each bay may receive one, or a plurality of medical monitoring/treatment units. When at least two medical monitoring/treatment units are received within the bay, the units may be in electrical communication with each other. In addition, the patient platform may include an internal power source. The internal power source may be disposed in the upper or lower housing bodies, or in both housing bodies.

The patient platform may further include a user interface housing coupled to the upper housing body. The user interface housing may be translatable between a compact position and an expanded position. In the compact position, the user interface housing is substantially abutting the top surface of the upper housing body. In the expanded position, the user interface housing is extended from the upper housing body. The user interface housing may include a display device capable of displaying patient monitoring/treatment data. The user interface housing may also include a data input enabling a user to input data/commands to regulate operation of the medical monitoring/treatment units. A head support may be deployable in response to extension of the user interface housing.

The patient platform may also include at least one input/output (I/O) port capable of connecting a sensor/treatment apparatus with the patient platform. Each I/O port is in electrical communication with at least one medical monitoring/treatment unit.

The patient platform may additionally comprise a leg support coupled to the lower housing body. The leg support may be selectively articulatable between a stowed position and a fully deployed position. In the stowed position, the leg support is substantially abutting the rear surface of the lower housing body. In the fully deployed position the leg support is substantially co-planar with the lower patient support surface. A lower triple lock hinge may be coupled to the lower housing body and the leg support, to enable disposing the leg support in the stowed position, fully deployed position and a partially deployed position. In the partially deployed position, the leg support is disposed between the stowed and fully deployed positions.

In addition, the patient platform may include a transceiver operative to enable communication with a remote facility, such as a hospital.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The detailed description set forth below is intended as a description of the presently preferred embodiment of the invention, and is not intended to represent the only form in which the present invention may be constructed or utilized. The description sets forth the functions and sequences of steps for constructing and operating the invention. It is to be understood, however, that the same or equivalent functions and sequences may be accomplished by different embodiments and that they are also intended to be encompassed within the scope of the invention.

The present invention is a lightweight, compact system of integrated medical, data and/or communication systems packaged to facilitate and support basic commonly accepted technological trauma treatment and care for a critically injured patient. This package may be implemented as a durable housing containing an assortment of subsystem units representing a basic set of diagnostic, therapeutic and data management functionalities as required for at least echelon one patient resuscitation and care. The units may be removable as individual units to enable maintenance or system reconfiguration in response to a patient's specific requirements.

Figure 1:
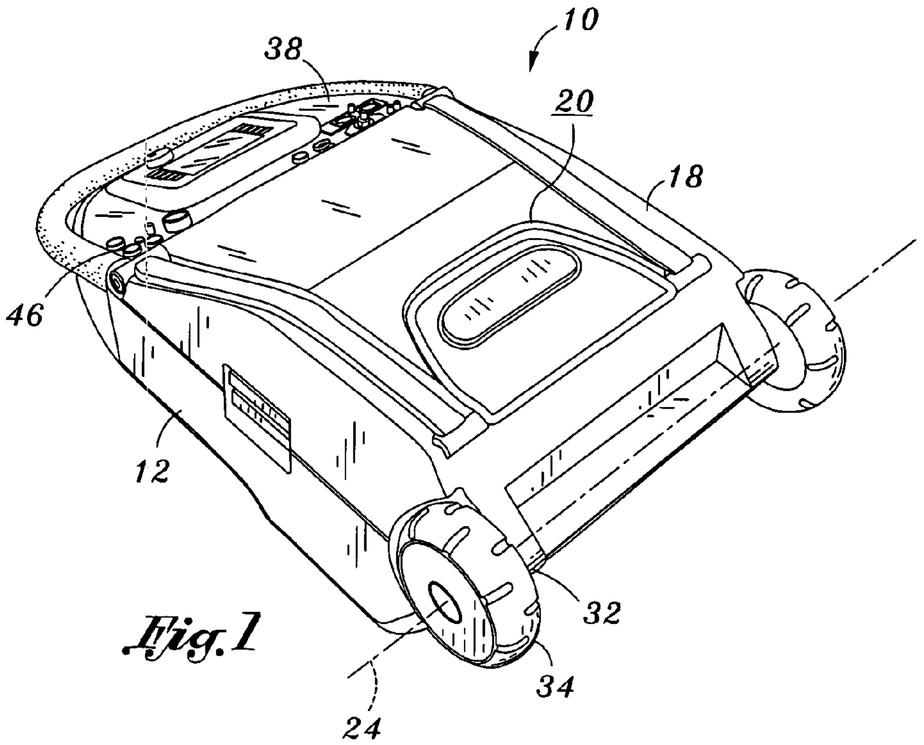
FIG. 1 is a perspective view of a trauma treatment and monitoring patient platform in a closed orientation.
Figure 2:
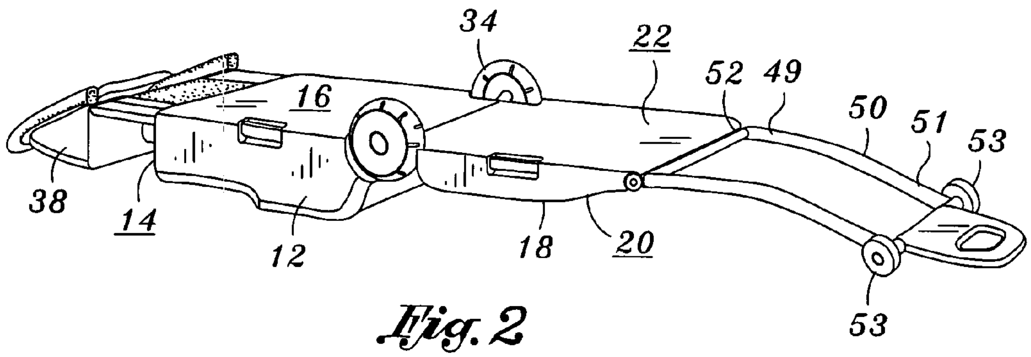
FIG. 2 is a perspective view of the trauma treatment and monitoring patient platform in an open orientation and the leg support in a fully open position.

Referring now to FIGS. 1-2, there is provided a foldable, portable, trauma treatment and monitoring, patient platform 10. The patient platform 10 includes an upper housing body 12 and a lower housing body 18. The upper housing body 12 includes a top surface 14, an upper patient support surface 16, and a rear surface 17. The lower housing body 18 includes a rear surface 20 and a lower patient support surface 22. The upper and lower patient support surfaces 16, 22 are cooperative to collectively support a patient. That is to say that the upper and lower patient support surfaces 16, 22 collectively form a surface that is capable of supporting a patient, much like a stretcher or litter. The upper and lower housing bodies 12, 18 are in pivotal communication to enable selective articulation about a hip pivoting axis 24 between a closed orientation and an open orientation. In other words, a user may selectively unfold the patient platform 10 into any orientation between the closed orientation and the open orientation. In the closed orientation, the upper patient support surface 16 is substantially flush with the lower patient support surface 22. The embodiment shown in FIG. 1 illustrates the patient platform 10 in the closed orientation. In the open orientation, the upper patient support surface 16 and lower patient support surface 22 are substantially co-planar. FIG. 2 shows an embodiment of the patient platform 10 in the open orientation. Preferably, the device 10 remains fully operational in both the closed and open orientations. The fact that the device 10 is in the closed orientation does not necessarily imply that the device 10 is not operational.

Figure 4:
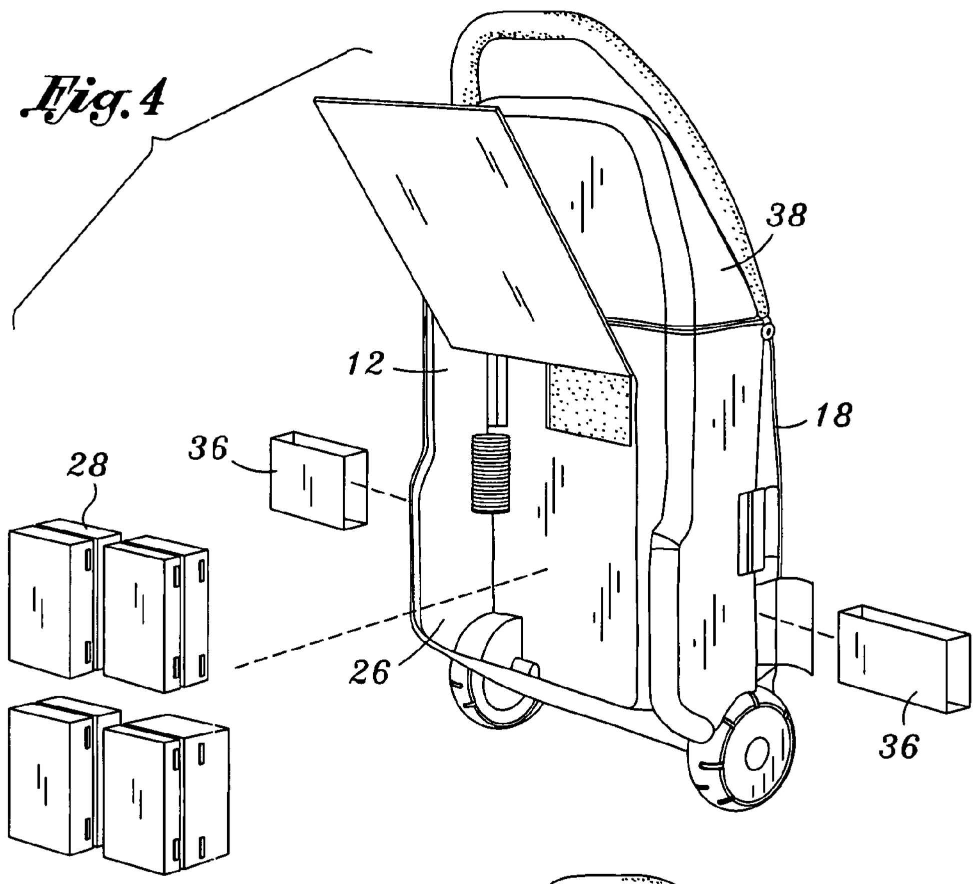
FIG. 4 is an exploded view of the trauma treatment and monitoring patient platform, medical monitoring/treatment units, and batteries, wherein the medical monitoring/treatment units are received within an upper housing body and the batteries are received within a lower housing body.
Figure 5:
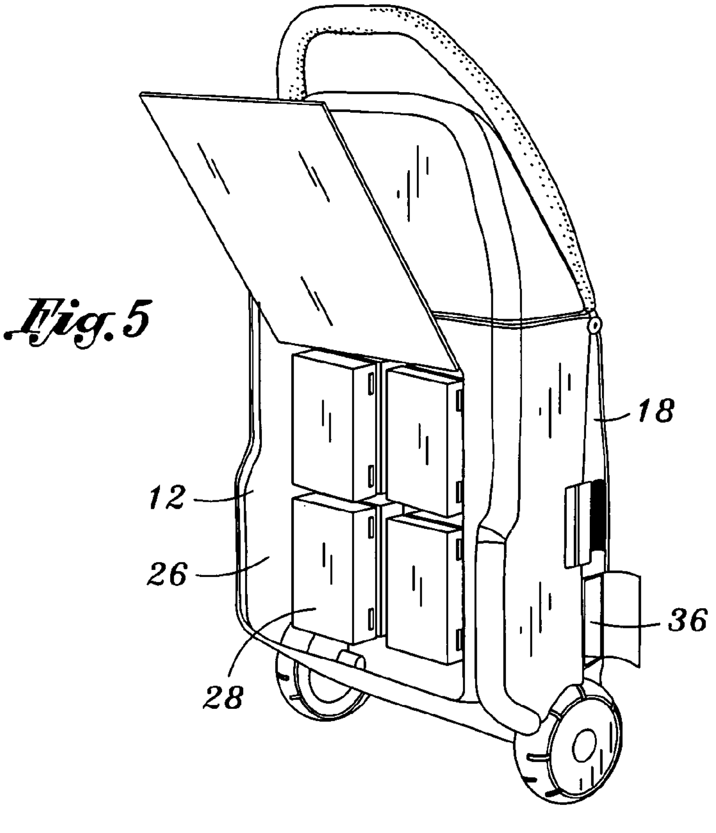
FIG. 5 is a perspective view of the trauma treatment and monitoring patient platform, wherein the medical monitoring/treatment units and batteries are placed therein.

It is contemplated that the patient platform 10 includes at least one bay 26 located within at least one of the upper and lower housing bodies 12, 18. The bay 26 is capable of receiving at least one medical monitoring/treatment unit(s) 28 therein. According to various embodiments, there may be only one bay 26 located in the upper housing body 12, or one bay 26 located in the lower housing body 18. In another embodiment, there may be a bay 26 located within both the upper and lower housing bodies 12, 18. In the embodiment shown in FIGS. 4-5, the patient platform 10 includes only one bay 26, which is located within the upper housing body 12. According to various embodiments, the bay 26 may be designed to receive only one unit 28 or multiple units 28. The bay 26 shown in FIGS. 4-5 is capable of receiving four units 28. When at least two units 28 are received within the bay 26, the units 28 may be in electrical communication with each other. As such, the units 28 may share power or data in order to facilitate patient treatment or monitoring. For instance, a patient's age, weight, or sex may be entered once and communicated between the units 28 rather than entering the same information for each unit 28.

As was mentioned above, each bay 26 receives at least one medical treatment/monitoring unit 28. As used herein, a unit 28 is a compact unit, which houses hardware operative to regulate medical functions, including patient treatment and/or monitoring functions. Exemplary medical functions capable of being regulated by the units 28 include, but are not limited to a clinical analyzer, a defibrillator, infusion pumps, suction/aspiration, ventilation, $CO_2/O_2$ flow, oxygen generator, and physical monitoring including pulse oximetry, temperature monitoring, respiratory rate/cardiac output monitoring, invasive and non-invasive blood pressure monitoring, ECG, ventilating and defibrillating. In one embodiment, the units 28 may be swapped into and out of the bay 26 as needed. For instance, if a defibrillator and heart rate monitor are needed, those units 28 are placed within the bay 26. Other units 28 may be removed from the bay 26 to make room for higher priority units 28. It is contemplated that such units 28 may be hot-swappable during operation of the patient platform 10. That is to say that the units 28 may be added or removed as necessary without turning the whole system off.

In operation, a medical provider carries the patient platform 10 to the patient's location. Upon arrival, the medical provider may unfold the platform 10 into a desirable orientation. However, if space is limited, the medical provider may decide to keep the patient platform 10 in the closed orientation, rather than unfolding the platform 10 into the partially open or open orientations. According to one embodiment, the patient platform 10 is operative while in the closed orientation. It may be beneficial to begin patient treating/monitoring while the patient platform 10 is in the closed orientation. For instance, if the patient does not require stabilization, the medical team may immediately begin patient care, rather than unfolding the patient platform 10. When medical treatment/care is performed on a patient while the patient platform 10 is in the closed orientation, the medical provider simply places the platform 10 in close proximity to the patient so as to enable patient treatment/monitoring.

Figure 8:
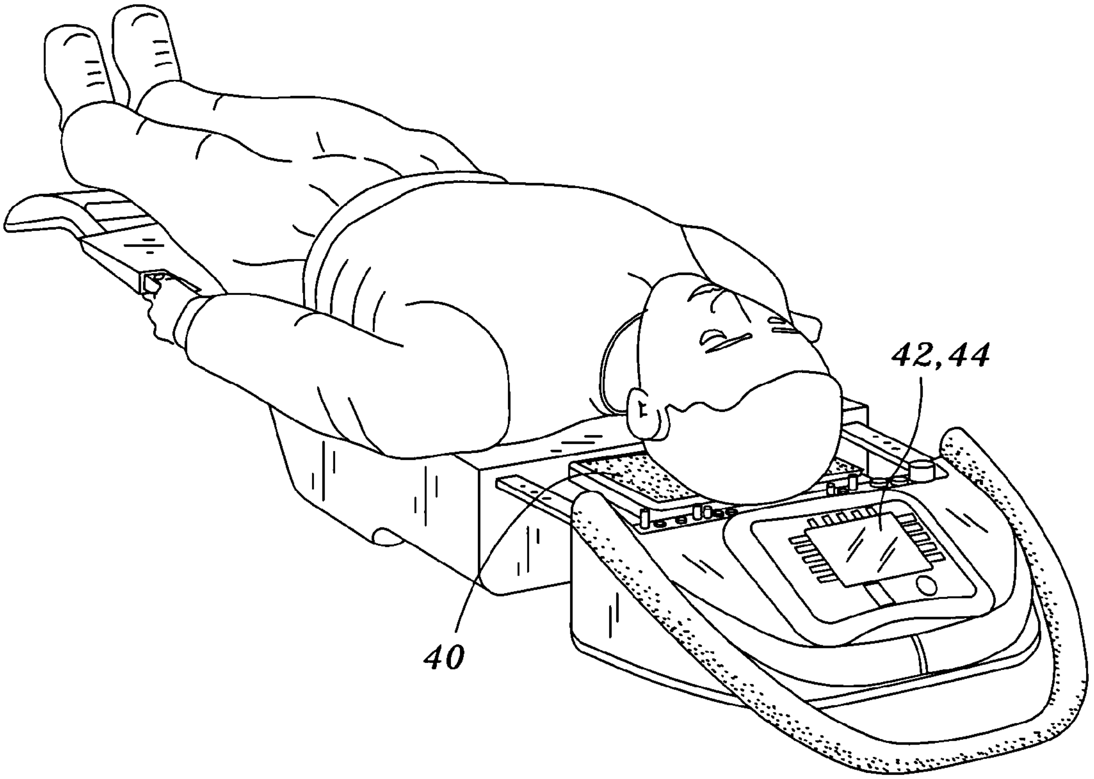
FIG. 8 is a perspective view of the trauma treatment and monitoring patient platform in the deployed orientation, wherein a patient is lying on the patient platform.

However, it may be beneficial to unfold the patient platform 10 into the open orientation. In this orientation, the patient may rest on the platform 10 so as to place the patient in a more desirable position for receiving treatment or care. Placing the patient on the platform 10 also provides patient stabilization. FIG. 8 shows a patient lying on the patient platform 10, wherein the platform 10 is in the open orientation. Instead of requiring an additional litter or stretcher, the patient may lie on the patient platform 10, thereby eliminating the need for an additional litter or stretcher.

On the other hand, it may be desirable to have the patient in an upright, or sitting position. As such, the medical provider may unfold the patient platform 10 into the partially open orientation. In the partially open orientation, the upper patient support surface 16 and lower patient support surface 22 are disposed between the closed and open orientations. In one embodiment, the medical provider may be able to more easily transport the patient while the platform 10 is in the partially open orientation. The platform 10 may include a wheel 34 that is engagable with a rolling surface when the patient platform 10 is in the partially open orientation.

In order to enable the patient platform 10 to pivot into the aforementioned orientations, one embodiment of the invention includes a triple stop hinge 32 coupled to the upper and lower housing bodies 12, 18. In other words, the triple stop hinge 32 maintains the platform 10 in the desired orientation. For a detailed discussion of the structure and operability of an exemplary hinge that may function as a triple stop hinge 32, see U.S. Pat. No. 7,093,321 to Burbrink et al. entitled Lockable Hinge, the disclosure of which is incorporated herein by reference.

Figure 6:
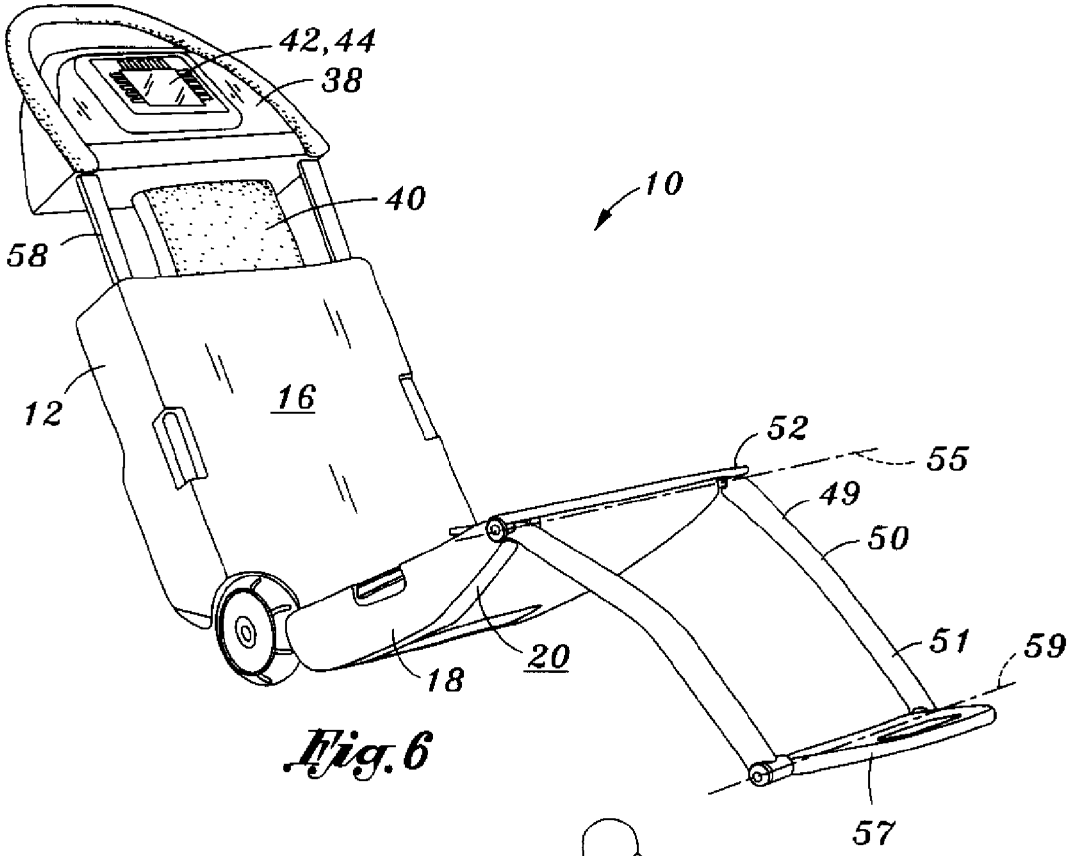
FIG. 6 is a perspective view of the trauma treatment and monitoring patient platform in a partially open orientation and a leg support in a partially open position.

In another embodiment of the invention, the patient platform 10 includes a leg support 50. FIG. 1 shows an embodiment of the invention with a leg support 50 coupled to the lower housing body 18. The leg support 50 includes a leg support proximal portion 49 and a leg support distal portion 51. The leg support proximal portion 49 is coupled to the lower housing body 18. The leg support 50 is selectively articulatable about a knee pivot axis 55 between a stowed position and a fully deployed position. As shown in FIG. 1, the leg support 50 is in the stowed position. In the stowed position, the leg support 50 is substantially abutting the rear surface 20 of the lower housing body 18. In this regard, the leg support 50 is folded into a position to facilitate transport of the patient platform 10. As such, it is contemplated that it may be particularly advantageous to keep the leg support 50 in the stowed position when the patient platform 10 is in the stowed orientation, as is shown in FIG. 1. The leg support 50 may be unfolded into the fully deployed position, as is illustrated in FIG. 2. When the leg support 50 is unfolded into the fully deployed position, the leg support 50 is substantially co-planar with the lower patient support surface 22. This may be desirable when the patient platform 10 is in the open orientation and a patient is lying on the upper and lower patient support surfaces 16, 22. FIG. 8 shows a patient lying on the upper and lower patient support surfaces 16, 22 with the leg support 50 in the fully deployed position. The leg support 50 may also be able to unfold into a position beyond the fully deployed position. In this regard, the leg support 50 pivots beyond the fully deployed position. In doing so, an obtuse angle is created between the leg support 50 and the lower patient support surface 22. Therefore, by pivoting the leg support 50 into a position beyond the fully deployed position when the patient platform 10 is in the fully deployed orientation, the leg support 50 is elevated above the rest of the patient platform 10. It may also be useful to unfold the leg support 50 into a partially deployed position, as is shown in FIG. 6. In the partially deployed position, the leg support 50 is disposed between the stowed position and the fully deployed position. It may be particularly advantageous to unfold the leg support 50 into the partially deployed position when the patient platform 10 is in the partially deployed orientation. In this regard, if the patient is sitting on the patient platform 10, the leg support 50 may provide a footrest 57 for the patient. The footrest 57 may articulate relative to the leg support 50 about a foot axis 59.

The leg support 50 may include leg support wheels 53, as shown in FIG. 2. The wheels 53 may be disposed at the leg support distal portion 51. The leg support wheels 53 facilitate movement of the patient platform 10. The wheels 53 may facilitate movement of the platform 10 when the leg support 50 is in the partially deployed or fully deployed positions. Furthermore, the leg support wheels 53 may additional facilitate movement of the platform 10 when the leg support 50 pivots beyond the fully deployed position.

According to another embodiment of the invention, the patient platform 10 may include a lower triple-lock hinge 52 to dispose the leg support 50 in the above-mentioned positions. The lower triple-lock hinge 52 is coupled to the lower housing body 18 and the leg support 50. The lower triple-lock hinge 52 maintains the leg support 50 in any of the above-mentioned positions.

In another embodiment of the invention, the patient platform 10 may not include a lower triple-stop hinge 52 to dispose the leg support 50 in the various positions. According to this embodiment, the leg support 50 does not pivot into the aforementioned positions. Rather, the leg support 50 merely translates between the stowed position and the fully deployed position. In this regard, the leg support 50 does not pivot, rather it translates. In this embodiment, the leg support 50 is not capable of being disposed in a partially deployed orientation because as the leg support 50 translates, it is always substantially co-planar with the lower patient support surface 22.

According to another embodiment, the patient platform 10 includes a user interface housing 38 coupled to the upper housing body 12. The user interface housing 38 is translatable between a compact position and an expanded position. In the compact position, the user interface housing 38 is substantially abutting the top surface 14 of the upper housing body 12. FIG. 1 shows the user interface housing 38 in the compact position. In the expanded position, the user interface housing 38 is extended from the upper housing body 12, as is shown in FIGS. 2 and 6. In the embodiment shown in FIGS. 2 and 6, the user interface housing 38 translates via guide rails 58. The guide rails 58 slides into and out of the upper housing body 12. Consequently, the user interface housing 38 translates between the compact and expanded positions.

In one embodiment of the invention, the patient platform 10 includes at least one input/output (I/O) port 46 operative to connect a sensor/treatment apparatus, or other external equipment with the patient platform 10. As used herein, a sensor/treatment apparatus is medical equipment which interfaces directly with the patient. For instance, the sensor/treatment apparatus may include, but is not limited to defibrillator paddles or a ventilator circuit. Each I/O port 46 is in electrical communication with at least one unit 28. Thus, the unit 28 is in communication with the sensor/treatment apparatus via the I/O ports 46. As such, the units 28 regulate the sensor/treatment apparatus by sending signals through the I/O ports 46. In turn, the sensor/treatment apparatus is able to send signals to the units 28 via the I/O ports 46. For instance, a unit 28 for monitoring a heart rate may send signals to heart rate monitoring apparatus via the I/O port 46. However, as the heart rate monitoring apparatus receives data relating to the patient's heart rate, it may send that data to the unit 28 via the I/O port 46. In one embodiment, the I/O port(s) 46 are exclusively disposed on the upper housing body 12, as is shown in FIG. 1. However, in other embodiments, I/O ports 46 may be disposed exclusively on the lower housing body 18, or on both the upper housing body 12 and the lower housing body 18.

According to another embodiment, the user interface housing 38 includes a data input 44. The data input 44 is operative to enable a user to input data/commands to regulate operation of the units 28. Examples of the type of data/commands that may be entered include, but is not limited to information relating to the patient, the patient's condition, the medical provider, and the patient's treatment or monitoring. In one embodiment, the data input 44 is an external device capable of connecting to the patient platform 10 through an I/O port 46. In another embodiment, the data input 44 is a touch-screen. In such an embodiment, the user is able to input commands by directly touching the screen of the data input 44.

In another embodiment of the invention, the user interface housing 38 includes a display device 42. The display device 42 is operative to display patient monitoring/treatment data. In this regard, the patient monitoring/treatment data may include any data relating to the patient or the patient's condition. This may include, but is not limited to data received from the sensor/treatment apparatus or unit 28 as well as a patient's medical file/history. According to one embodiment, the display device 42 is an external device capable of connecting to the patient platform 10 through an I/O port 46. In another embodiment, the display device 42 and data input 44 are integrated into the same piece of hardware. For instance, when the data input 44 includes a touch screen monitor, the touch screen monitor may also serve as a display device 42.

Another embodiment of the present invention includes a head support 40. The head support 40 provides a surface upon which a patient may rest his head. The head support 40 is deployable in response to extension of the user interface housing 38. In the embodiment shown in FIG. 2, the head support 40 is coupled to the user interface housing 38 such that when the user interface housing 38 translates from the compact position to the expanded position, the head support 40 deploys. When the user interface housing 38 is in the compact position, the head support is not accessible. The head support 40 may be comprised of a nylon netting material, or other materials known by those having skill in the art. According to another embodiment the head support 40 may be a rigid extension of the user interface housing 38. In this embodiment, as the user interface housing 38 translates into the expanded position, the head support 40 is positioned in a location that is approximately where a patient's head would rest. In this embodiment, the head support 40 may include a cushion or padding to make the head support 40 more comfortable.

In addition to the foregoing, an embodiment of the present invention includes a transceiver for communicating with a remote facility. The remote facility may be a hospital or other medical care facility. The transceiver may be used to transmit the patient's current condition to the remote facility so personnel at the remote facility can prepare for the patient's arrival. In addition, the patient's medical file/history or other information relating to the patient and/or his condition may be communicated via the transceiver. The transceiver may be in electrical communication with the units 28, display device 42, data input 44, I/O port(s) 46, or any other hardware contained within or connected to the patient platform 10. In one embodiment, the transceiver may use wireless technology such as WiFi, Bluetooth, wireless Internet, radio signals, or other wireless technology known or later developed, to communicate with the remote facility.

The patient platform 10 may receive power from both internal and external power sources. The external source may be used to both power the system and recharge the internal source. According to one embodiment of the invention, an internal power source 36 is disposed within at least one of the upper and lower housing bodies 12, 18. However, it is understood that one embodiment of the invention includes internal power sources 36 in both the upper and lower housing bodies 12, 18. In the embodiment shown in FIG. 4-5, the internal power source 36 is located in the lower housing body 18. The internal power source 36 may include batteries. When at least two batteries are used as the internal power source 36, the batteries may be hot-swappable during use. That is to say that one battery may be removed or replaced with another battery without stopping operation of the platform 10.

Figure 3B:
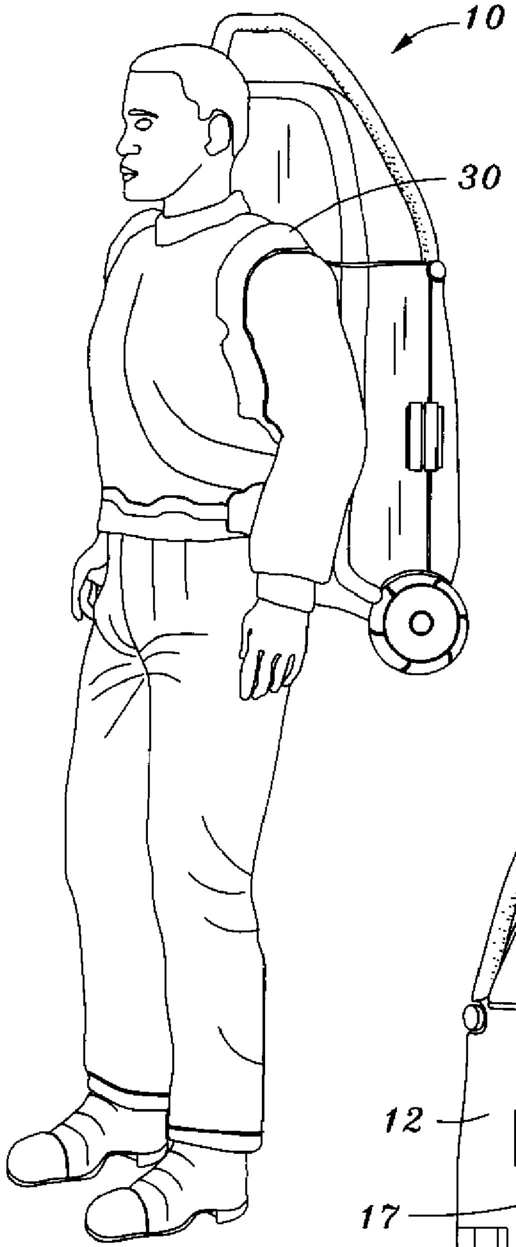
FIG. 3B is a perspective view of the medical provider carrying the trauma treatment and monitoring patient platform as a backpack.
Figure 3A:
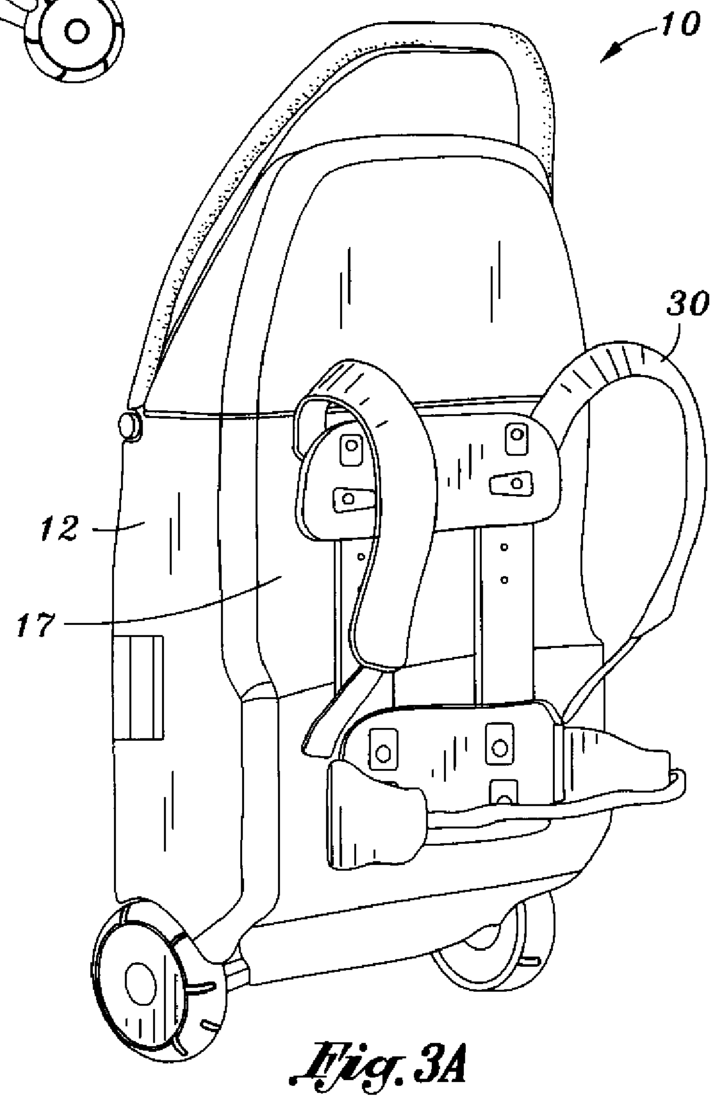
FIG. 3A is a perspective view of the trauma treatment and monitoring patient platform in the closed orientation, wherein a pair of straps are coupled to the upper housing body.

It is expressly contemplated that the present invention is lightweight and highly portable. It is intended that the patient platform 10 is configured to be man portable, requiring only one person to set up and operate. In order to facilitate transport of the platform 10, at least one strap 30 may be coupled to the patient platform 10. The strap(s) 30 may be coupled to the upper housing body 12 or lower housing body 18. FIG. 3A shows the patient platform 10 with two straps 30 coupled to the upper housing body 12. As is shown in FIG. 3B, the straps 30 enable a user to carry the patient platform 10 like a back-pack.

Figure 7:
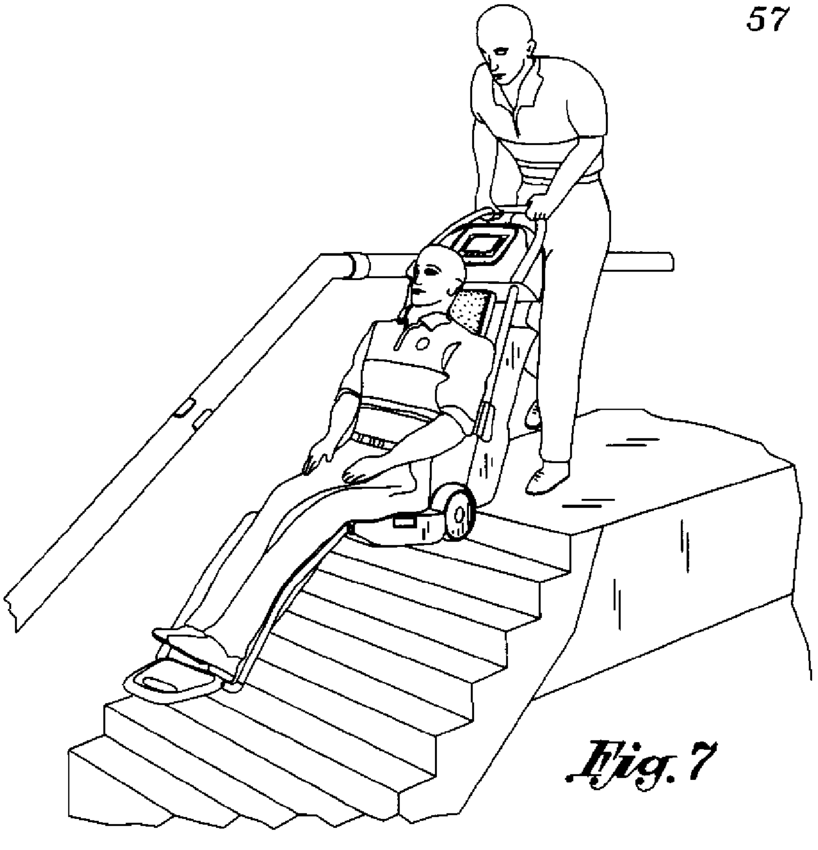
FIG. 7 is a perspective view of the trauma treatment and monitoring patient platform in the partially open orientation and the leg support in the partially deployed position, where in the patient platform is being maneuvered on a flight of stairs.

In another embodiment, the patient platform 10 may include a housing wheel 34 to increase the portability of the patient platform 10. In one embodiment, the housing wheel 34 is disposed substantially adjacent to the pivoting axis 24. The embodiment shown in FIG. 1 includes a housing wheel 34 disposed substantially adjacent to the pivoting axis 24. The housing wheel 34 may be coupled to the upper housing body 12 and/or the lower housing body 18. In one embodiment the housing wheel 34 is able to facilitate movement of the patient platform 10 when the platform 10 is in the closed orientation or the partially open orientation, but not the open orientation, as can be seen in FIGS. 1, 2, and 6. It may be desirable to disengage the housing wheel 34 from a rolling surface while the patient platform 10 is in the open orientation so that the platform 10 does not roll or move while the patient is lying on the platform 10. Conversely, it may be beneficial to engage the housing wheel 34 with a rolling surface while the patient platform 10 is in the closed or partially open orientations. In the closed orientation, it is desirable because a user may tow the platform 10 during transport, rather than carry the platform 10 is in the partially open orientation, a wheel 34 may be desirable because the housing wheel 34 may facilitate transport of the patient. For instance, if the patient must be transported up or down a flight of stairs, the housing wheel 34 may facilitate such transport. FIG. 7 shows the patient platform 10 in the partially open orientation on a flight of stairs.

According to another embodiment the patient platform 10 may be able to integrate with a litter or stretcher. The litter may be a standard NATO litter, or any other litter or stretcher apparatus used by those skilled in the art. The patient platform 10 may include at least one attachment member coupled to upper housing body 12, lower housing body 18, user interface housing 38, or leg support 50 to facilitate coupling to a litter. The attachment member(s) 56 may include hooks, straps or other attachments means known by those skilled in the art.

In addition, the patient platform 10 may also include a mounting member for integrating the device with transportation vehicles. In one embodiment, the mounting member is operative to enable integration with an air casualty transport vehicle. The air casualty transport vehicle may include an airplane, helicopter or similar air transport vehicles used to transport a patient to a hospital or medical care facility. Integration with an air casualty transport vehicle stabilizes the patient platform 10 during transport, especially during turbulence or aggressive flying maneuvers. In another embodiment, the mounting member may enable integration with a ground casualty transport vehicle, including ambulances and other emergency transport vehicles.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A foldable, portable, trauma treatment and monitoring, patient platform comprising:

an upper housing body including a top surface and an upper patient support surface; a lower housing body including a rear surface and a lower patient support surface, the upper and lower patient support surfaces being cooperative to collectively support a patient, the lower housing and upper housing being in pivotal communication to enable selective articulation about a hip pivot axis between a closed orientation for transporting the patient platform without a patient thereon, a completely open orientation for supporting the patient in a prone position, and a partially open orientation for transporting a patient in a seated position, the upper patient support surface being substantially parallel to and facing the lower patient support surface in the closed position, the upper patient support surface and lower patient support surface being substantially coplanar in the open position, the upper patient support surface and lower patient support surface being disposed between the closed orientation and the completely open orientation when in the partially open orientation;

at least one bay located within at least one of the upper and lower housing bodies, the bay being configured to receive at least one medical monitoring/treatment unit a leg support coupled to the lower housing body, the leg support and lower housing body are pivotal about a knee pivot axis, the hip pivot axis being disposable adjacent a patient's hip and the knee pivot axis being disposable adjacent a patient's knees when the patient is disposed on the patient platform; and a footrest coupled to the leg support, the footrest and leg support being pivotal about a foot pivot axis.

2. The patient platform of claim 1, further comprising at least one strap coupled to the upper housing body, the strap being operative to enable a medical provider to carry the patient platform in the closed orientation during transport.

3. The patient platform of claim 1, further comprising a triple-stop hinge coupled to the upper and lower housing bodies, the triple-stop hinge being capable of disposing the patient platform in the closed orientation, the open orientation, and the partially open orientation.

4. The patient platform of claim 1, further comprising a wheel being disposed substantially adjacent to the pivoting axis, the wheel being operative to facilitate platform movement when the platform is in the closed orientation and the partially open orientation.

5. The patient platform of claim 1, further comprising a wheel being coupled to the upper body housing, the wheel being operative to facilitate platform movement when the platform is in the closed orientation and the partially open orientation.

6. The patient platform of claim 1, wherein the patient platform includes a mounting member enabling integration with an air casualty transport vehicle.

7. The patient platform of claim 1, further including an internal power source disposed within at least one of the upper and lower housing bodies.

8. The patient platform of claim 7, further comprising at least one I/O port electrically connectable to the at least one medical monitoring/treatment unit and a sensor/treatment apparatus, wherein the at least one bay is configured to receive at least one medical monitoring/treatment unit while the platform is in the power ON state to assume an inserted configuration, wherein the at least one medical monitoring/treatment unit is engaged with the at least one of the upper and lower housing bodies and is in electrical communication with the power source, the at least one bay further being configured to enable selective detachment of the at least one medical monitoring/treatment unit therefrom while the platform is in the power ON state.

9. The patient platform of claim 1, wherein the bay is located within the upper housing.

10. The patient platform of claim 1, wherein at least two medical monitoring/treatment units are disposed within the bay.

11. The patient platform of claim 10, wherein the at least two medical monitoring and treatment units are in electrical communication with each other.

12. The patient platform of claim 1, further comprising a user interface housing coupled to the upper housing body, the user interface housing being translatable between a compact position wherein the user interface housing is substantially abutting the top surface of the upper housing body, and an expanded position wherein the user interface housing is extended from the upper housing body.

13. The patient platform of claim 12, further comprising a head support deployable in response to extension of the user interface housing.

14. The patient platform of claim 12, wherein the user interface housing includes a display device being operative to display patient monitoring/treatment data.

15. The patient platform of claim 12, wherein the user interface housing includes a data input enabling a user to input data/commands to regulate operation of the medical monitoring/treatment units.

16. The patient platform of claim 15, wherein the data input is a touch-screen.

17. The patient platform of claim 1, further comprising at least one I/O port being operative to connect a sensor/treatment apparatus with the patient platform, the at least one I/O port being in electrical communication with the at least one medical monitoring/treatment unit.

18. The patient platform of claim 17, wherein the sensor/treatment apparatus is a defibrillator paddle.

19. The patient platform of claim 17, wherein the sensor/treatment apparatus is a ventilator circuit.

20. The patient platform of claim 17, wherein the sensor/treatment apparatus is a high rate fluid infusion device.

21. The patient platform of claim 1, wherein the leg support having a leg support proximal portion and a leg support distal portion, the leg support proximal portion being coupled to the lower housing body.

22. The patient platform of claim 21, wherein the leg support is selectively articulatable between a stowed position wherein the leg support is substantially abutting the rear surface of the lower housing body, and a fully deployed position wherein the leg support is substantially co-planar with the lower patient support surface.

23. The patient platform of claim 22, further comprising a lower triple-lock hinge coupled to the lower housing body and the leg support, the lower triple-lock hinge being capable of disposing the leg support in the stowed position, fully deployed position and a partially deployed position wherein the leg support is disposed between the stowed position and the fully deployed position.

24. The patient platform of claim 21, further comprising a leg support wheel disposed at the leg support distal portion, the leg support wheel being operative to facilitate platform movement.

25. The patient platform of claim 1, wherein the patient platform is configured to urge the patient's knees to bend when the platform is moved toward the partially open orientation.

26. The patient platform of claim 1, wherein the foot pivot axis is disposable adjacent the patient's feet when the patient is disposed thereon.

27. The patient platform of claim 1, wherein the patient platform further is configured to transport a patient in a seated position by a single person.

28. The patient platform of claim 1, further comprising wheels connected to the upper housing body proximate the hip pivot axis to allow transport of the patient in the seated position by a single person.

29. The patient platform of claim 28, wherein the wheels are spaced from the rear surface of the upper housing body when the patient platform is in the closed position.

30. The patient platform of claim 29, wherein the wheels are spaced from a user when the user carries the patient platform in the closed position as a backpack.

31. The patient platform of claim 28, wherein the patient platform is configured for transport in the closed position by a single person.

32. The patient platform of claim 31, further comprising a pair of straps arrayed on a rear surface of the upper housing body for enabling a user to carry the patient platform in the closed position as a backpack.

* * * * *